3,528,951
COPOLYMERIZATION OF ACRYLONITRILE
David Harry Kohn and Samuel Hanan Ronel, Haifa, Israel, assignors to Technion Research and Development Foundation Limited, Technion City, Haifa, Israel
No Drawing. Filed Mar. 26, 1968, Ser. No. 715,996
Claims priority, application Israel, Mar. 28, 1967, 27,702
Int. Cl. C08f 15/22, 45/60
U.S. Cl. 260—78.5          6 Claims

ABSTRACT OF THE DISCLOSURE

Novel copolymers of acrylonitrile with certain derivatives of arylidene nitriles are produced which possess a far greater degree of color stability, malleability and solubility than the acrylonitrile polymers known heretofore.

RELATED APPLICATIONS

This application claims priority from our pending Israeli application No. 27,702 filed in Israel on Mar. 28, 1967.

FIELD OF THE INVENTION

Novel copolymers of acrylonitrile useful for the formation of transparent films and also for the formation of cast articles.

DESCRIPTION OF THE PRIOR ART

Acrylonitrile polymers are well known in the art. They are readily prepared by conventional methods of polymerization such as emulsion or solution polymerization. Such polymers are relatively stable to heat, i.e., up to 150° to 100° C. and on ignition burn only slowly.

Unfortunately, however, the polyacrylonitriles prepared heretofore do not flow readily and hence cannot be processed by conventional molding methods for thermoplastic materials, such as injection molding, extrusion molding and the like. Furthermore, these polymers are incompatible with conventional plasticizers and are insoluble in most organic solvents; being soluble only in very polar solvents such as dimethyl sulfoxide, dimethyl formamide or concentrate aqueous solutions of certain salts such as zinc chloride. Thus the industrial applications of polyacrylonitrile have hitherto been limited.

The novel copolymers of the present invention retain the conventional advantages of polyacrylonitrile since the modification introduced into the polymeric system is very similar to the acrylonitrile moiety itself. Moreover, the novel copolymers have the additional advantage of being easier to mold. They have a greater degree of color stability, even without the addition of stabilizers, with which they are of course also compatible.

Yet another advantage of the novel copolymers is that they have a far higher degree of solubility in conventional solvents, and hence may be utilized, for example, for the preparation of fibers.

SUMMARY OF THE INVENTION

The novel copolymers of the present invention comprise recurring units of monomeric acrylonitrile and up to 35% by weight of recurring units derive from monomers of the general formula

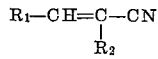

in which $R_1$ is an unsubstituted or substituted phenyl or naphthyl, and $R_2$ is hydrogen, cyano, or a carboxylic ester group—$COOR_3$, wherein $R_3$ is alkyl having from 1 to 12 carbon atoms, cycloalkyl, phenyl or phenylalkyl.

The polymerization may be carried out in any of the conventional modes. Solution, emulsion, suspension, slurry or bulk polymerization are suitable. These may be initiated by conventional polymerization initiators such as redox initiators, free radical initiators or ionic initiators.

The insolubility and lack of flow of homopoly-acrylonitrile has been attributed to its structure which is dominated by strong dipole-dipole interaction between some of the nitrile groups. While we do not wish to be committed to a theory, it is believed that in the copolymers of acrylonitrile of the present invention, the bulkier unsaturated nitriles added as comonomers reduce the dipole-dipole interaction between some of the nitrile groups resulting in better flow of the molten polymers which not only renders them more readily susceptible to various shaping operations, but also contributes to their greater solubility in organic solvents. Thus, it may be theorized that the nitrile comonomers used in the preparation of the novel polymers of the present invention operate as internal plasticizers which do not negatively affect the stability of the copolymers compared with the homopolyacrylonitrile.

STATEMENT OF UTILITY

The novel comonomers of the present invention may be pressure molded at temperatures of between 130° and 180° C. to form transparent bars and tablets.

In view of their greater solubility in polar organic solvents or aqueous salt solutions than homopolyacrylonitrile, strong, thin, colorless and transparent films may be cast from the solutions thereof and strong fibers may be prepared by precipitation from solutions of the same.

PREFERRED EMBODIMENTS

In the preferred embodiments of the present invention the comonomer polymerized with acrylonitrile has the following general formula,

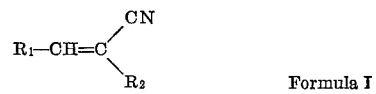

Formula I wherein $R_1$ is phenyl or substituted phenyl, wherein the substituent groups are lower alkoxy having from 1 to 4 carbon atoms or lower alkyl having from 1 to 4 carbon atoms, naphthyl, substituted naphthyl wherein the substituents are lower alkoxy of 1 to 4 carbon atoms or lower alkyl of from 1 to 4 carbon atoms, $R_2$ is hydrogen, cyano, or a carboxylic ester group—$COOR_3$ wherein $R_3$ is alkyl having from 1 to 12 carbon atoms, cycloalkyl having from 4 to 8 carbon atoms, phenyl, or phenyl alkyl, wherein the alkyl moiety has 1 or 2 carbon atoms.

In accordance with the present invention, the amount of comonomer of Formula I is less than 35% by weight of the total monomer mixture. It should be understood that all proportions between 3 and 35% by weight of comonomer relative to the total monomer mixture is within the scope of the present invention, the preferred range of comonomer content being 5 to 15% by weight, and the proportion of comonomer being variable according to the modification of properties of acrylonitrile which is desired. Thus, in many cases, an amount of 10% by weight or even less of the comonomer calculated on mixtures of monomers yields copolymers whose flow properties and solubilities are considerably improved as compared with those of homopolyacrylonitrile.

The polymerization may be initiated in any conventional manner. Redox initiation, free radical initiation, or ionic initiation are preferred. In the redox mode of initiation as practiced in the present invention, a redox initiator system comprising an aqueous solution of an alkali metal or alkaline earth metal perchlorate or persulfate in the presence of an alkali metal sulfite, suitably sodium bisulfite, is prepared. Aqueous solutions of compounds such as sodium, potassium, lithium, calcium, barium, magnesium and strontium perchlorates or persulfates are especially suitable. Polymerization is effective in a salt solution containing a weight ratio of from about 0.1 to 1 gram of metal perchlorate or persulfate in 10 ml. of water together with from about 0.05 to about .5 gram of bisulfite in 10 ml. of water. The catalytic solution is added to an aqueous solution or emulsion of the acrylonitrile and co-monomer having a concentration of from about 5 to about 15% by weight of monomers. A ratio of from about 5 to about 15% by volume of catalyst solution relative to aqueous monomer solution is preferred.

Polymerization is carried out at a temperature of from about 25 to 50° C., preferably from about 30 to about 40° C. in an inert atmosphere, suitably a nitrogen atmosphere.

Any of the known free radical forming catalysts such as hydrogen peroxide, benzoyl peroxide, cumene hydroperoxide, tertiary butyl hydroperoxide, ditertiary butyl peroxide, t-butylperoxypivalate, lauroyl peroxide, or acetyl peroxide; azo-bisisobutyronitrile; sometimes also together with p-toluene sulfinic acid; or the like, may be employed herein. These initiators are utilized in conventional catalytic quantities, e.g. from about 0.01% to about 5% by weight, based on the total weight of the monomer or monomers to be polymerized. Amounts exceeding 5% could be used but are frequently unnecessary and may impart coloration to the acrylonitrile polymer produced, which may in some instances be undesirable.

Ionizing radiation such as gamma radiation, or visible or ultraviolet light may also be used as initiators.

Polymerization can also be carried out by anionic initiation using sodium methoxide, butyl lithium, or the like, as initiators.

Suitable color stabilizers can be added to the copolymers of the invention. Among such color stabilizers are the alkylaminopropionitriles disclosed by Shavit et al., U.S. Pat. No. 3,345,350.

The polymerization mass may additionally include, as noted above, suitable quantities of plasticizers, fillers, reinforcing materials, coloring materials, surfactants, salts, and oxides of metals, or like additives known in the plastic art.

The invention is illustrated by the following examples to which it is not limited:

EXAMPLE 1

Copolymerization in emulsion by redox initiation

In a resin-flask fitted with stirrer, reflux condenser and gas-inlet tube for nitrogen, 1.5 g. of sodium lauryl sulfate (emulsifier) was dissolved in 60 ml. of distilled boiled water. 10 g. of ethyl benzylidenecyanoacetate dissolved in 53 g. of acrylonitrile was added while stirring uniformly at 350 r.p.m. Then a redox catalyst system was added in the form of 0.1 g. of potassium persulfate dissolved in 10 ml. of water followed by 0.017 g. of sodium bisulfite dissolved in 10 ml. of water. The polymerization was carried out at 35° C. in nitrogen atmosphere during 4.5 hours. The emulsion was then poured into an aqueous solution of 10 g. of sodium chloride in 200 ml. of water in order to precipitate the copolymer. The copolymer was filtered off, washed with water and methanol and dried. Yield: 26 g. (41%).

The presence of the co-monomer in the copolymer product was determined by the infra-red spectrum of a film, cast from a solution of the copolymer in dimethyl sulfoxide.

EXAMPLE 2

Copolymerization in suspension by free-radical initiation

The same apparatus as described in Example 1 was used.

To a solution of 0.72 g. of disodium hydrogen phosphate dodecahydrate and 10.2 ml. of 0.88 N ammonia in 250 ml. of water, a solution of 3 g. of $CaCl_2 \cdot 6H_2O$ in 150 ml. of water was added during about 15 minutes at room temperature, while stirring at about 400 r.p.m. Immediately a fine precipitate of calcium phosphate started to appear. After raising the temperature up to 65° C., a solution of 12 g. of the co-monomer benzylidenemalononitrile and 1.2 g. of azo-diisobutyronitrile (AIBN) in 160 g. of acrylonitrile was added slowly. After three hours the copolymer in form of opaque pearls was filtered off. It was washed with 15% hydrochloric acid, water and methanol and then dried. The copolymer was obtained in a yield of 110 g. corresponding to 65% of the theory. The molar composition of the copolymer determined by chemical analysis was 94.2% acrylonitrile and 5.8% benzylidenemalononitrile.

The intrinsic viscosity of a solution of the copolymer in dimethyl sulfoxide, determined at 25° C., was $[\eta]=3.15$. The glass transition points were at 88.5° and 123.5° C.

A specimen, moulded for three minutes at 170° C. under a pressure of 7000 kg./cm.$^2$, had a tensile strength of 113 kg./cm.$^2$. A specimen moulded for three minutes at 215° C. under a pressure of 4000 kg./cm.$^2$ had a compressive strength of 1260 kg./cm.$^2$.

A 80 micron film, prepared from a dimethyl sulfoxide solution, had a tensile strength of 468 kg./cm.$^2$, a modulus of elasticity of $2.0 \times 10^4$ kg./cm.$^2$ and a maximal elongation of 15.5%.

EXAMPLE 3

Copolymerization in suspension by free-radical initiation

The same apparatus as described in Example 1 was used.

A suspension of calcium phosphate was prepared by adding a solution of 0.5 g. of calcium chloride hexahydrate in 25 ml. of water to a solution of 0.12 g. of disodium hydrogen phosphate dodecahydrate and 1.7 ml. of 0.88 N ammonia in 40 ml. of water, under the conditions as given in Example 2. The temperature was raised to 60° C. and a solution of 7.05 g. of the co-monomer cinnamonitrile and 0.17 g. of the initiator AIBN in 26.5 g. of acrylonitrile was added slowly. After a three hour reaction time, the product was separated, washed and dried, as in Example 2. The yield of the copolymer was 15 g. corresponding to 45.5% of the theory and its molar composition determined by chemical analysis was 96% acrylonitrile and 4% cinnamonitrile.

The intrinsic viscosity of a solution of the copolymer in dimethyl sulfoxide at 25° C. was $[\eta]=3.35$. The copolymer had glass transition points at 88.5° C. and 121.5° C., determined by the "penetrometer" method.

A cylindrical specimen, moulded for ten minutes at 145° C. and a pressure of about 6000 kg./cm.$^2$, had a compressive strength of 1440 kg./cm.$^2$.

A 17 micron film, prepared from a dimethyl sulfoxide solution, had a tensile strength of 635 kg./cm.$^2$, a modulus of elasticity of $2.6 \times 10^4$ kg./cm.$^2$ and a maximal elongation of 3.9%.

EXAMPLE 4

Copolymerization in suspension by free-radical initiation

The same apparatus as described in Example 1 was used.

To a solution of 0.36 g. of disodium hydrogen phosphate dodecahydrate and 5.1 ml. of 0.88 N ammonia in 120 ml. of water, a solution of 1.5 g. of calcium chloride in 75 ml. of water was added dropwise during about 15 minutes at room temperature while stirring at about 400 r.p.m. Immediately calcium phosphate started to precipitate. The temperature was raised to 70° C. and a solution of 20.1 g. of the co-monomer ethyl benzylidene-cyanoacetate and 0.35 g. of the initiator AIBN in 79.6 g. of acrylonitrile was added slowly. After a reaction time of four hours, the copolymer in the form of opaque pearls was filtered off. It was washed as in Example 2 and dried. The copolymer was obtained in a yield of 63 g. corresponding to 63.8% of the theory. Its molar composition determined by chemical analysis was 96.8% acrylonitrile and 3.2% ethyl benzylidene-cyanoacetate.

The intrinsic viscosity of a solution of the copolymer in dimethyl sulfoxide, determined at 25° C. was $[\eta]=3.20$. The glass-transition points of this copolymer were at 85.5° C. and 118° C.

A specimen, moulded for eight minutes at 175° C. under a pressure of about 7000 kg./cm.$^2$, had a tensile strength of 212 kg./cm.$^2$.

A cylindrical specimen, moulded for five minutes at 155° C., using a pressure of about 2000 kg./cm.$^2$, had a compressive strength of 1080 kg./cm.$^2$.

An 18 micron film, prepared from a dimethyl sulfoxide solution, has a tensile strength of 611 kg./cm.$^2$, a modulus of elasticity of $2.8 \times 10^4$ kg./cm.$^2$ and a maximal elongation of 10.2%.

EXAMPLE 5

Copolymerization in suspension by free-radical initiation

The same apparatus as described in Example 1 was used.

To a stirred solution of 0.1 g. of polyvinyl alcohol (medium viscosity) in 100 ml. of distilled water, a solution of 2.57 g. of the comonomer n-hexyl benzylidene-cyanoacetate and 0.27 g. of the initiator AIBN in 53 g. of acrylonitrile was added dropwise at the reaction temperature of 61–62° C. After two hours, the copolymer in the form of a fine precipitate was filtered off, washed with water and methanol and dried.

The yield was 30 g. corresponding to 55% of the theory.

The presence of the comonomer in the coploymer product was determined by the infra-red spectrum of a thin film, cast from a dimethyl sulfoxide solution. The intrinsic viscosity of a solution of the copolymer in dimethyl sulfoxide, determined at 25° C., was $[\eta]=8.55$. The glass transition points were at 82° and 111° C.

EXAMPLE 6

Copolymerization in suspension by free-radical initiation

The same apparatus as described in Example 1 was used.

To a solution of 0.3 g. of disodium hydrogen phosphate dodecahydrate and 5 ml. of 0.88 N ammonia in 100 ml. of degazed water, a solution of 1.5 g. of calcium chloride in 50 ml. of water was added during ten minutes at room temperature while stirring at about 400 r.p.m. The suspension of calcium phosphate appeared immediately. After raising the temperature to 68° C., a solution of 2.5 g. of the comonomer cyclohexyl benzylidenecyano-acetate and 0.05 g. of the initiator AIBN in 50.0 g. of acrylonitrile was added dropwise. After two hours, the copolymer in form of opaque pearls was filtered off and treated as in Example 2. The copolymer was obtained in a yield of 35 g. corresponding to 63% of the theory. The presence of the comonomer was determined by infrared spectrum of a thin film, cast from a solution of the copolymer in dimethyl sulfoxide.

The intrinsic viscosity of the copolymer, determined at 25° C. was $[\eta]=7.38$. The glass transition points were at 82° C. and 117° C.

Transparent cylindrical specimens were obtained by moulding at 140–160° C. and a pressure of about 2000 kg./cm.$^2$ during three minutes.

EXAMPLE 7

Copolymerization in slurry by redox initiation

The same apparatus as in Example 1 was used.

To a solution of 26 g. of acrylonitrile and 3.5 g. of benzylidenemalononitrile ($R_1$=phenyl; $R_2$=CN) in 250 ml. of boiled distilled water, a redox initiator system in the form of 0.9 g. of potassium persulfate in 10 ml. of water and 0.23 g. of sodium bisulfite in 10 ml. of water, was added while stirring. The polymerization was carried out at 40° C. in nitrogen atmosphere. Soon after addition of the redox catalyst, the copolymer started to precipitate. After five hours the copolymer was filtered off, it was washed with water, methanol and diethyl ether and then it was dried. The dry copolymer containing 9% of the comonomer as determined by chemical analysis, was obtained as a white powder. The yield was 6 g. corresponding to 16.5% of the theory.

EXAMPLE 8

Copolymerization in slurry by redox initiation

The same apparatus as in Example 1 was used.

To a solution of 22 g. of acrylonitrile and 8 g. of ethyl benzylidenecyanoacetate in 300 ml. of boiled distilled water, a redox catalyst system, in the form of 0.3 g. of potassium persulfate in 10 ml. of water and 0.08 g. of sodium bisulfite in 10 ml. of water was added while stirring. Working under the same conditions as in Example 7, the yield of the copolymer was 10.2 g. corresponding to 34% of the theory. The comonomer content was determined by infra-red spectrum.

EXAMPLE 9

Coploymerization in solution by free-radical initiation

The same apparatus as described in Example 1 was used.

To 150 ml. of dry dimethyl sulfoxide, a solution of 2.6 g. of the comonomer benzyl benzylidenecyanoacetate and 0.27 g. of the initiator AIBN in 53.0 g. of acrylonitrile was added dropwise at the reaction temperature of 66° C. After five hours, the copolymer was precipitated by pouring the viscous solution into methanol in a high-speed blender. The product was washed several times with methanol, filtered off and dried. The copolymer was obtained in a yield of 13 g. corresponding to 24% of the theory. The comonomer content was determined by infra-red spectrum.

The intrinsic viscosity of the copolymer, determined at 25° C. in dimethyl sulfoxide, was $[\eta]=1.45$. The glass transition points were at 70° C. and 120° C.

EXAMPLE 10

Copolymerization in solution

The same apparatus as described in Example 1 was used.

To a solution of 10.6 g. of acrylonitrile and 4 g. of ethyl benzylidenecyanoacetate in 50 ml. of distilled dimethyl formamide, 0.15 g. of benzoyl peroxide was added. The mixture was stirred during three hours at a temperature of 25° C., then filtered and the polymer was precipitated by adding methanol. Yield: 4.5 g. polymer corresponding to 31% of the theory. The presence of the comonomer was determined by infra-red spectrum.

EXAMPLE 11

Anionic copolymerization

In a reaction flask fitted with stirrer, reflux condenser, thermometer, gas inlet tube for nitrogen and a neoprene stopper, 26.5 g. of acrylonitrile and 10.0 g. of the comonomer ethyl benzylidenecyanoacetate were dissolved in 60 ml. of dry toluene. The solution was cooled to −15° C. and 4 ml. of a 2 N solution of sodium methoxide in methanol was added by a syringe through the neoprene stopper. After about 30 minutes the solution became yellow and an exothermic reaction occurred. After two hours, the polymerization was stopped by addition of 15% hydrochloric acid. The mixture was poured on ice, the copolymer was filtered off and washed with diluted hydrochloric acid, water and methanol. After drying, the copolymer was obtained in a yield of 16 g. corresponding to 44% of the theory. The presence of the comonomer in the copolymer was determined by infra-red spectrum.

EXAMPLE 12

Anionic copolymerization

Using an apparatus as described in Example 11, 10.6 g. of acrylonitrile and 3.1 g. of benzylidenemalonitrile were dissolved in 70 ml. of dry toluene. The solution was cooled to −73° C. and a 1.5 ml. of a 1.25 N butyl lithium solution was added by a syringe through the neoprene stopper.

After one hour, polymerization was stopped by adding 15% hydrochloric acid. The mixture was poured on ice, the copolymer was filtered off and washed with diluted hydrochloric acid, water and methanol. The copolymer was obtained in a yield of 1.5 g. corresponding to 11% of the theory. The presence of the comonomer in the copolymer was determined by infra-red spectrum.

EXAMPLE 13

Copolymerization in bulk

To 16.4 g. of a solution of ethyl benzylidenecyanoacetate in 48 g. of acrylonitrile, kept at 70° C. under nitrogen atmosphere, 0.15 g. of benzoyl peroxide was added in small portions. After one hour the temperature was permitted to rise to 80° and kept at this level for 2.5 hours. A yellow polymer precipitated as fine powder. It was washed with methanol and dried. Yield: 3.2 g. corresponding to 5% of the theory. The presence of the comonomer was determined by infra-red spectrum.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A novel copolymer recurring units devised from monomeric acrylonitrile and from 3 to 35% by weight relative to the total polymer of recurring units derived from monomers having the general formula

in which $R_1$ is phenyl or naphthyl, substituted phenyl or substituted naphthyl wherein the substituent is lower alkoxy of from 1 to 4 carbon atoms, or lower alkyl of from 1 to 4 carbon atoms, and $R_2$ is cyano or —$COOR_3$ wherein $R_3$ is alkyl having from 1 to 12 carbon atoms, cycloalkyl having from 4 to 8 carbon atoms, phenyl, or phenylalkyl, wherein the alkyl has 1 or 2 carbon atoms.

2. A copolymer according to claim 1 wherein the comonomer is ethylbenzylidene cyanoacetate.

3. A copolymer according to claim 1 wherein the comonomer is benzylidene malononitrile.

4. A copolymer according to claim 1 wherein the comonomer is N-hexylbenzylidene cyanoacetate.

5. A copolymer according to claim 1 wherein the comonomer is cyclohexylbenzylidene cyanoacetate.

6. A copolymer according to claim 1 wherein the comonomer is benzylbenzylidene cyanoacetate.

References Cited

UNITED STATES PATENTS 3,067,181 12/1962 Kluiber _____ 260—85.5
3,260,709 7/1966 Nield _____ 260—85.5
3,345,350 10/1967 Shavit _____ 260—85.5

JOSEPH L. SCHOFER, Primary Examiner

J. KIGHT III, Assistant Examiner

U.S. Cl. X.R.

260—85.5; 162—157